(12) United States Patent
Chakraborty et al.

(10) Patent No.: US 7,962,774 B2
(45) Date of Patent: Jun. 14, 2011

(54) OVER-PROVISIONED MULTICORE PROCESSOR

(75) Inventors: Koushik Chakraborty, Madison, WI (US); Philip M. Wells, Madison, MI (US); Gurindar S. Sohi, Madison, WI (US)

(73) Assignee: Wisconsin Alumni Research Foundation, Madsion, WI (US)

( * ) Notice: Subject to any disclaimer, the term of this patent is extended or adjusted under 35 U.S.C. 154(b) by 918 days.

(21) Appl. No.: 11/867,508

(22) Filed: Oct. 4, 2007

(65) Prior Publication Data

US 2009/0094438 A1    Apr. 9, 2009

(51) Int. Cl.
*G06F 1/32* (2006.01)

(52) U.S. Cl. .................. 713/323; 713/320; 713/324

(58) Field of Classification Search .................. None
See application file for complete search history.

(56) References Cited

U.S. PATENT DOCUMENTS

| | | | |
|---|---|---|---|
| 7,086,058 B2 | 8/2006 | Luick | |
| 7,093,147 B2 | 8/2006 | Farkas et al. | |
| 7,249,268 B2 | 7/2007 | Bhandarkar | |
| 7,412,353 B2 * | 8/2008 | Borkar et al. | 702/186 |
| 2008/0028244 A1 * | 1/2008 | Capps et al. | 713/324 |
| 2008/0115010 A1 * | 5/2008 | Rothman et al. | 714/10 |
| 2008/0163255 A1 * | 7/2008 | Munoz et al. | 719/318 |

OTHER PUBLICATIONS

Chakraborty, et al, Computation Spreading: Employing Hardware Migration to Specialize CMP Cores On-the-fly, ASPLOS '06, Oct. 21-25, 2006, San Jose, California, USA.
Wenisch, Stephen Somogyi, et al., Temporal Streaming of Shared Memory, Proceedings of the 32nd International Symposium on Computer Architecture, ISCA 2005, ACM, NY, NY.
Wells, Philip M., Hardware Support for Spin Management in Over-committed Virtual Machines, Parallel Architectures and Compilation Techniques Conference, Sep. 16-20, 2006, pp. 124-133, Seattle, Washington.
Welsh, Matt et al., SEDA: An Architecture for Well-Conditioned, Scalable Internet Services, pp. 230-243, Proceedings of the Eighteenth Symposium on Operating Systems Principles (SOSP-18), Banff, Canada, Oct. 2001.
Uhlig, Rich et al., Intel Virtualization Technology, IEEE Computer, May 2005, pp. 48-56, IEEE Computer Society, Washington, DC.
Torrellas, et al, Benefits of Cache-Affinity Scheduling in Shared Memory Multiprocessor: A Summary, ACM Sigmetrics, pp. 272-274, May 1993, New York, New York.
Torrellas, et al, Characterizing the Caching and Synchronization Performance of a Multiprocessor Operating System, Fifth International Conference on Architectural Support for Programming Languages and Operating Systems, pp. 162-174, Oct. 1992, ACM, NY, NY.
Speight, Evan, et al., Adaptive Mechanisms and Policies for Managing Cache Hierarchies in Chip Multiprocessors, Proceedings of the $32^{nd}$ International Symposium on Computer Architecture ISCA '05 ACM, NY, NY.
Smith, Alan Jay, Cache Memories, Computing Surveys, Sep. 1982, vol. 14, No. 3, pp. 474-530, ACM, NY, NY.

(Continued)

*Primary Examiner* — Dennis M Butler
(74) *Attorney, Agent, or Firm* — Boyle Fredrickson, S.C.

(57) ABSTRACT

An over-provisioned multicore processor employs more cores than can simultaneously run within the power envelope of the processor, enabling advanced processor control techniques for more efficient workload execution, despite significantly decreasing the duty cycle of the active cores so that on average a full core or more may not be operating.

23 Claims, 4 Drawing Sheets

OTHER PUBLICATIONS

Ramirez, Alex, et al., Code Layout Optimization for Transaction Processing Workloads, Proceedings of the 28th International Symposium on Computer Architecture, ISCA 2005, pp. 155-164, ACM, NY, NY.

Redstone, Joshua, et al., An Analysis of Operating System Behavior on a Simultaneous Multithreaded Architecture, Proceedings of the 9$^{th}$ International Conference on Architecture Support for Programming Languages and Operating Systems, Nov. 2000, pp. 245-256, ACM, NY, NY.

Magnusson, Peter S., et al, Simics: A Full Systems Simulation Platform, IEEE Computer, Feb. 2002, pp. 50-58, IEEE Computer Society, Washington, DC.

Pai, Vivek S., et al., Locality-Aware Request Distribution in Cluster-based Network Servers, Proceedings of the 8$^{th}$ International Conference on Architecture Support for Programming Languages and Operating Systems, Oct. 1998, pp. 205-216, ACM, NY, NY.

Lo, Jack L., et al., An Analysis of Database Workload Performance on Simultaneous Multiheaded Processors, Proceedings of the 25th International Symposium on Computer Architecture, ISCA, Jun. 1998, pp. 39-50, IEEE—USA, Washington, DC.

Lee, Hsein-Hsin S., et al., Stack Value File: Custom Microarchitecture for the Stack, High-Performance Computer Architecture, 2001. HPCA. The Seventh International Symposium on Jan. 19-24, 2001, pp. 5-14, IEEE—USA, Washington, DC.

Li, Tao, et al., Understanding and Improving Operating System Effects in Control Flow Prediction, Proceedings of the 10th International Conference on Architectural Support for Programming Languages and Operating Systems (ASPLOS-X), San Jose, California, Oct. 5-9, 2002, pp. 68-80, ACM, NY, NY.

Larus, James R. et al., Using Cohort Scheduling to Enhance Server Performance, USENIX Annual Technical Conference Proceedings of the General Track of the annual conference on USENIX Annual Technical Conference, 2002, pp. 103-114, USENIX Association Berkeley, CA.

Kumar, Rakesh, et al., Single-ISA Heterogeneous Multi-Core Architectures for Multithreaded Workload Performance, Proceedings of the 31st International Symposium on Computer Architecture ISCA 2004, IEEE—USA, Washington, DC.

Harizopoulos, Stavros, et al., Steps Towards Cache-Resident Transaction Processing, Proceedings of the 30th VLDB Conference, Toronto, Canada, Aug. 29-Sep. 3, 2004, pp. 660-671.

Gloy, Nicolas, et al., An Analysis of Dynamic Branch Prediction Schemes on System Workload, Proceedings of the 23rd International Symposium on Computer Architecture, ISCA May 1996, pp. 12-50, ACM, NY, NY.

Eden, A.N., et al., The YAGS Branch Prediction Scheme, Proceedings of the 31st Annual ACM/IEEE International Symposium on Microarchitecture, 1998, pp. 69-77, IEEE, Washington, DC.

Beckman, Bradford M., et al., Managing Wire Delay in Large Chip-Microprocessor Caches, Proceedings of the 37th Annual International Symposium on Microarchitecture, 2004, IEEE, Washington, DC.

Chang, Jichuan, et al., Cooperative Caching for Chip Multiprocessors, Proceedings of the 33$^{rd}$ International Symposium on Computer Architecture, 2006, IEEE, Washington, DC.

Barroso, Luiz Andre, et al., Memory System Characterization of Commercial Workloads, Proceedings of the 25th annual international symposium on Computer Architecture, 1998, pp. 3-14, IEEE, Washington, DC.

Barford, Paul, et al., Generating Representative Web Workloads for Network and Server Performance, pp. 151-160, Sigmetrics '98/Performance'98, Joint International Conference on Measurement and Modeling of Computer Systems, 1998, pp. 151-160, ACM, NY, NY.

Balakrishnan, Saisanthosh, et al., The Impact of Performance Asymmetry in Emerging Multicore Architectures, Proceedings of the 32$^{nd}$ International Symposium on Computer Architecture, 2005, IEEE, Washington, DC.

Anderson, Thomas E., et al., The Interaction of Architecture and Operating System Design, The Interaction of Architecture and Operating System Design, Proceedings of the Fourth International Conference on Architectural Support for Programming Languages and Operating Systems, 1991, pp. 108-120, ACM, NY, NY.

Alameldeen, Alaa R., et al., Variability in Architectural Simulations of Multi-threaded Workloads, Proceedings of the Ninth Internation Symposium on High-Performance Computer Architecture, 2003, IEEE, Washington, DC.

Ailamkai Anastassia, et al., DBMSs on a Modern Processor: Where Does Time Go?. Proceedings of the 25th VLDB Conference, Edinburgh, Scotland, 1999, pp. 266-277.

Agarwal, Anant, et al., Cache Performance of Operating System and Multiprogramming Workloads, ACM Transactions on Computer Systems, vol. 6, No. 4, Nov. 1988, pp. 393,431, ACM, NY, NY.

* cited by examiner

OVER-PROVISIONED MULTICORE PROCESSOR

STATEMENT REGARDING FEDERALLY SPONSORED RESEARCH OR DEVELOPMENT

This invention was made with United States government support awarded by the following agency:
NSF 0311572
The United States government has certain rights in this invention.

CROSS-REFERENCE TO RELATED APPLICATIONS

BACKGROUND OF THE INVENTION

The ability to produce smaller transistors has allowed the construction of microprocessors with greater transistor density and thus many more transistors. It is predicted that in two generations, as the industry moves from 65 nm technology to 32 nm technology, high-performance microprocessors will contain more than four billion transistors.

The promise of growing numbers of transistor devices, and practical limits to further increasing the performance of single-core microprocessors, has led the industry to investigate the production of multicore microprocessor systems. A multicore microprocessor provides multiple microprocessor "cores" on a single integrated circuit (or "chip"), the cores communicating with each other and with entities outside the microprocessor chip (e.g., shared memory) using some common mechanism.

Smaller transistors can have improved energy efficiency; however, generally the energy efficiency of next generation transistors lags behind the growth in transistor density. This growing disparity leads to two distinct problems: (1) the problem of "power density", often leading to "local thermal hot-spots," where a particular region of the chip consumes more power than can be quickly dissipated, causing a rapid rise in temperature in that region, and (2) the problem of "global power dissipation," where the power consumed by the entire chip cannot be fully dissipated using cost-effective cooling methods. These problems may place various limitations on simultaneous use of the growing resources, and are expected to largely dictate the provisioning and use of resources in future multicore systems.

Generally, the resources of a multicore processor, including the cores and components associated with the cores, are provisioned such that they are expected to be highly utilized by a set of important application programs. When resources are highly utilized, the potential problems of global heat dissipation and local hot-spots can be addressed using a number of known techniques. For example, resources may have their clock speeds reduced to lower their temperature while still allowing them to operate, or may be shut off altogether allowing them to cool.

On the other hand, when certain other applications do not highly utilize all of the multicore resources, global heat dissipation may be less problematic, and other methods of mitigating thermal hot-spots arise. For example, some multicore processor resources, such as caches, can be put into a sleep state when they are not being used to reduce the total power consumption of the microprocessor. Alternatively, a technique known as "Activity Migration" can interchange the use of active and idle resources, such that previously active resources become idle and cool down, while cooler, previously idle resources become active and begin to warm. Applying activity migration to an entire core means that computation being performed on a hot, active core is moved to a cooler, idle core, using a technique known as "Heat and Run."

Each of these cases limits the duty cycle of the resources to less than 100%, preventing the thermal envelope of the chip, defining its maximum power dissipation at acceptable operating temperatures, from being exceeded, and also preventing local hot-spots from causing localized damage to the circuits. However, this reduction of duty cycle may lead to a loss of performance depending on the nature of the application and the number of resources available.

Potentially, the number of resources that may be provisioned in an integrated circuit, in particular the number of cores, is limited only by the available area of the chip substrate. Conventional wisdom, however, is that cores may be added usefully to a chip only until the aggregate reduction in duty cycle of the cores to manage heat dissipation reaches the processing power of one full core. When operating near this thermal limit, adding an additional core requires a commensurate reduction in duty cycle of the other cores that is greater than the extra processing time added by the additional core, thereby leading to an overall degradation in performance. Conventional wisdom also indicates that additional core resources should be added only when it is expected that certain important applications will be able to utilize these resources.

BRIEF SUMMARY OF THE INVENTION

The present inventors have recognized that it may be desirable to produce an "over-provisioned" multicore processor system (OMPS) in which there are substantially more cores than can be run simultaneously within the given thermal envelope of the substrate. Although the extra cores, when run, require other cores to stop operating, the present inventors have determined that these extra cores can nevertheless substantially improve processing speed, for example, using techniques such as computation spreading, where the extra cores prevent both contention delays and software synchronization problems. As a result, even though the number of simultaneously operating cores is not increased, the "energy-delay product" of typical workloads can be improved by 5 to 20%. Thus counter-intuitively, extra cores that cannot run while the existing cores are performing may nevertheless be justified for both performance and energy reasons.

Specifically then, the present invention provides an over-provisioned multicore electronic computer having N operable cores held on a substrate having a thermal dissipation limit that allows only M cores to operate simultaneously. The computer further includes a core controller that: (1) during an execution period, repeatedly switch each of the N cores between an active state in which computation is performed and a quiescent state in which no computation is performed, and back again; and (2) during the execution period, allow no more than M cores to be simultaneously in the active state. Importantly, M is at least one less than N.

Thus it is one object of one embodiment of the invention to increase the effective computational power of a multicore processor without increasing its thermal power dissipation. Although the over-provisioned cores may only operate by "stealing" time from other cores, they nevertheless provide diversity that can increase the actual throughput of advanced computational processes by retaining, in close proximity to the core, operating state used for speculative execution, including but not limited to branch predictions and cached values.

The cores in the quiescent state may have their clocks stopped and operating power reduced. Further, or in the alternative, the cores in the quiescent state may shut down a central processing unit and its associated caches.

Thus it is an object of one embodiment of the invention to reduce, as much as possible, the heat and power loads of those cores not actively participating in processing.

The core controller for switching the cores from active and quiescent state may be implemented in at least one of firmware, software, and circuitry.

Thus it is one object of at least one embodiment of the invention to provide an over provisioned multicore processor that may flexibly operate in a variety of modes.

The quiescent state may maintain registers relating to predictive functions used in speculative execution by the cores, but shut down other storage elements so that this data of the other storage elements is lost.

Thus it is an object of one embodiment of the invention to retain predictive information likely to have long-term benefits to efficient processing while allowing registers or other storage elements containing short-term thread related data to be shut down.

The core controller may move a program thread being executed from the core being switched to the quiescent state, to a core in the operating state.

Thus it is an object of one embodiment of the invention to allow those cores not actively performing an operation to be fully shut down.

The core controller may switch the cores between operating states and quiescent states as a function of time and/or temperature.

Thus it is an object of one embodiment of the invention to allow the cores to operate near the limits of the thermal envelope by cycling through cores as necessary.

The core controller may switch the cores from the operating state to the quiescent state when a core failure is detected and from the quiescent state to the operating state when a core failure is no longer detected.

Thus it is an object of one embodiment of the invention to allow the use of an over-provisioned multicore processor to address a potential future problem of intermittent core failure in high-performance multicore microprocessors.

The core controller may switch the cores between an operating state and a quiescent state as triggered by an operating program allocating instructions among the different cores so that cores waiting for instructions are switched to a quiescent state.

Thus it is an object of one embodiment of the invention to produce a multicore processor particularly suited toward computation spreading where the benefits of having extra cores in reducing contention justifies a significant proportion of quiescent cores.

These particular features and advantages may apply to only some embodiments falling within the claims and thus do not define the scope of the invention.

DETAILED DESCRIPTION OF THE INVENTION

Figure 1:
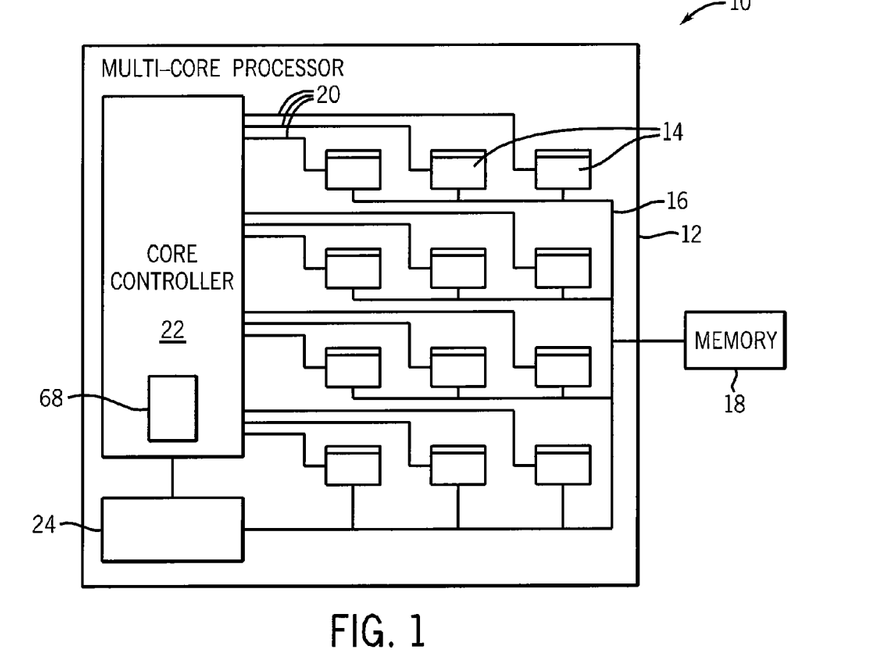
FIG. 1 is a block diagram of an over-provisioned multicore processor of the present invention providing twelve cores under the control of a core controller, only eight of which may operate at a given time.

Referring now to FIG. 1, an over-provisioned multicore processor 10 includes a thermal substrate 12, for example, a silicon wafer, supporting multiple cores 14. Each of the cores 14 communicates with each other and with a shared memory 18 (normally located off the substrate 12) by means of communication lines 16. A core controller 22 manages the on-chip core resources (including whether the cores 14 are in an active or quiescent state as will be described below) and allocation of various computation fragments 52 (e.g., software threads) onto these cores 14. This core controller 22 can be implemented as an integrated switching circuit or as a component of the firmware, or as a part of the software including the low level system software such as an operating system or a virtual machine monitor (VMM).

Figure 2:
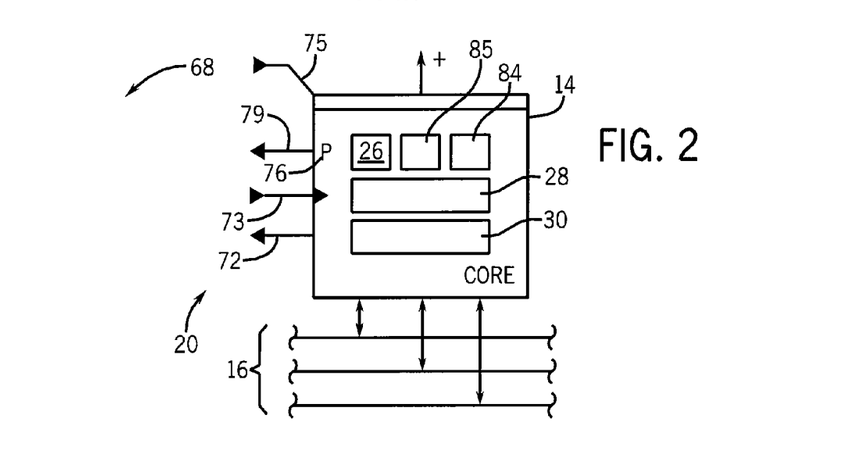
FIG. 2 is a detailed view of a core of FIG. 1 showing control lines communicating among each core and the core controller or a memory bus.

Referring now to FIG. 2, each core 14 may include a central processing unit (CPU) 26 and, for example, a first and second cache 28 and 30 such as an L1 and L2 cache of a type known in the art. Alternatively each core 14 may include additional or fewer levels of cache as is understood in the art. The communication lines 16 provide mechanisms to communicate address, data and control messages (including cache coherence protocols) of types known in the art. Each core 14 may include storage elements 83 such as registers which contain predictive state used to facilitate speculative execution as is known in the art, and storage elements 84 which contain other program state not used for speculative execution as is known in the art. During operation, the multiple cores 14 may independently execute different threads of application programs held in shared memory 18 according to techniques known in the art.

Figure 3:
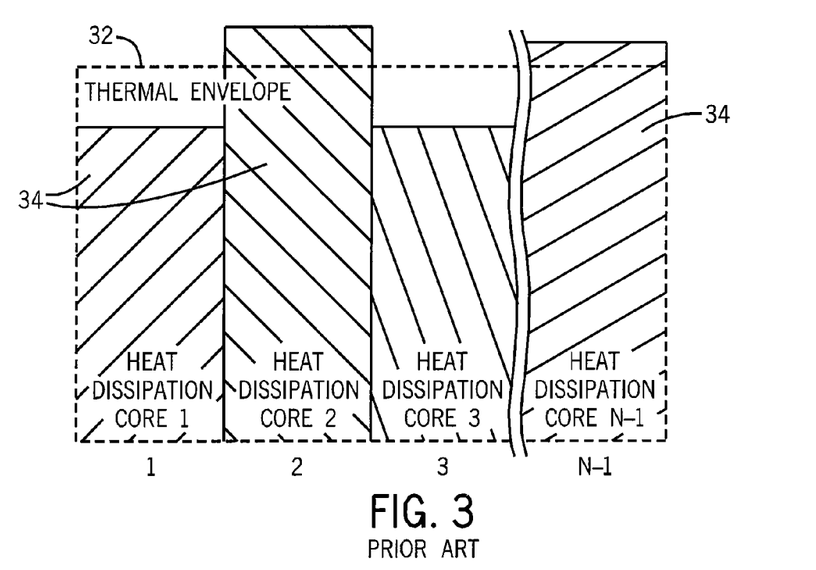
FIG. 3 is a schematic representation of the thermal envelope of a standard multicore processor showing operation of the multiple cores within an average power dissipation defined by the thermal envelope.
Figure 4:
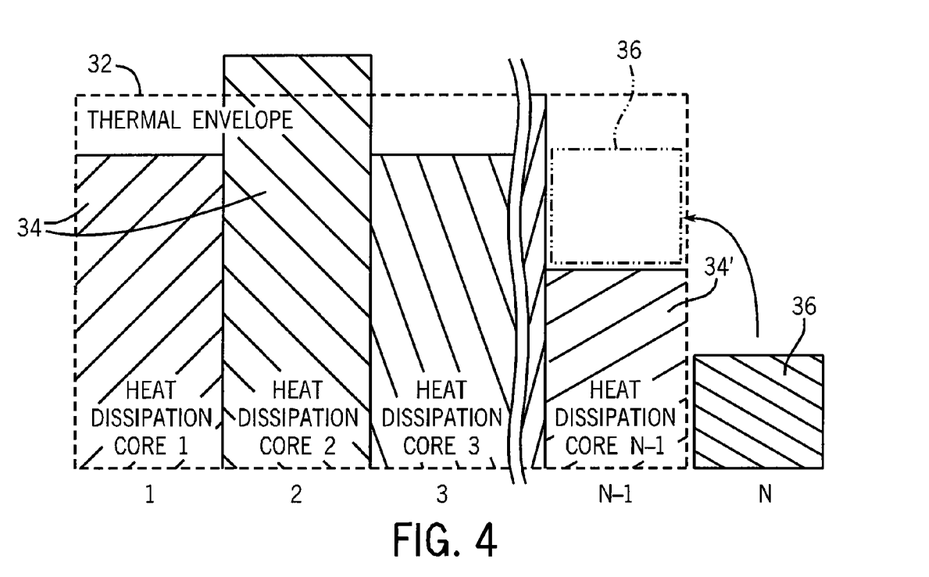
FIG. 4 is a figure similar to that of FIG. 3 showing the over-provisioned multicore processor of the present invention in which an additional core reduces the duty cycle of operation of the existing cores within the thermal envelope because of its quiescent power dissipation.

Referring now also to FIGS. 3 and 4, for both a prior art multicore processor and the present invention, the substrate 12 presents a thermal envelope 32 which represents the amount of heat that can be dissipated by the substrate 12 in the steady-state using specified cooling systems (e.g., heat sink) without raising the substrate 12 and cores 14 to temperatures which may accelerate damage or cause erroneous computation. The thermal envelope 32 is represented as a rectangle whose area is a measure of dissipated thermal power.

Normally each of the cores 14 may provide a heat dissipation 34 represented by smaller rectangles and equal to the power dissipated by the core in its operating state. Normally, the sum of the heat dissipations 34 will average slightly less then the area of the thermal envelope 32 when the multicore processor is running at maximum capacity. The heat dissipation of individual cores 14 may vary depending upon the nature of computation performed. However, when the sum of fluctuating heat dissipations 34 of the individual cores 14 threatens to exceed the thermal envelope 32, portions of the cores 14 may be shut down or their clock speeds reduced to decrease their power consumption and thus their heat dissipations 34.

Referring to FIG. 3, generally, for an aggressive design following the teachings of the prior art, the difference between the sum of the heat dissipations 34 and the thermal envelope 32 when the multicore processor 10 is operating at full capacity will be much less than the heat dissipation 34 of one new core, else an additional core could be added to improve performance while remaining within the heat dissipation criteria.

Referring now to FIG. 4, the present invention differs from the prior art by adding at least one additional core 14 (indicated as N) ostensibly outside the thermal envelope 32 to the extent that the thermal envelope 32 is fully committed by the heat loads 34 of the existing cores 14. Without any loss of generality, we illustrate the present invention using a single additional core. That is, we add the core N to the substrate 12 with a thermal envelope 32 that supports only N−1 heat loads 34. Safe operation of the over-provisioned multicore processor 10 (that is, operation without the potential for both incorrect computation, and accelerated and lasting damage to the cores 14) is obtained by placing one core 14 (in this case core N) in a quiescent state having a significantly reduced heat dissipation represented by quiescent heat load 36.

The quiescent heat dissipation 36 requires at least one other core 14 (N−1 as depicted) to operate at a reduced heat load 34' slightly less than could be obtained if core N were not on the substrate 12. Superficially, then, the addition of core N to the operation of a thermally limited, fully-provisioned, state-of-the-art multicore processor 10, would appear to provide no net benefit, and in fact results in a slight decrease in aggregate core availability because of the quiescent heat dissipation of core N. Ostensibly then the present invention provides slightly decreased aggregate core availability with an additional cost of core N.

The steady state active fraction of the cores 14, being a measure of their ability to operate all at once, and expressed as a fraction whose numerator is combined processing power of cores that may, in the steady state, be simultaneously active, and whose denominator is the combined potential processing power of all the cores active or not, decreases with the present invention. The term "steady state" is intended to exclude a situation where cores 14 may temporarily operate outside of the thermal envelope 32 making use of the inherent heat capacity of the substrate when the substrate is at less than its maximum design temperature. Furthermore, it also excludes temporary measures taken to recover from thermal emergencies or hotspot avoidance.

The present invention has a steady-state active fraction that is always less than one. More typically, the steady state active fraction may be less than 90% or less than 67%, the latter for example, occurring with a 12-core processor where only 8 cores are active at once. This formula, of course, assumes cores 14 having equal processing power and it must be understood to be summations of actual processing powers for heterogeneous processors.

Despite its apparent disadvantages, the present invention may nevertheless provide for a substantially reduced "energy-delay product" when used with specialized techniques such as computation spreading. "Energy-delay product" is the product of energy used (and thus needing to be dissipated) and delay as measured by the time required to perform a particular computation task such as a benchmark. In essence, the present invention offers a platform for dynamic specialization techniques such as computation spreading.

Figure 6:
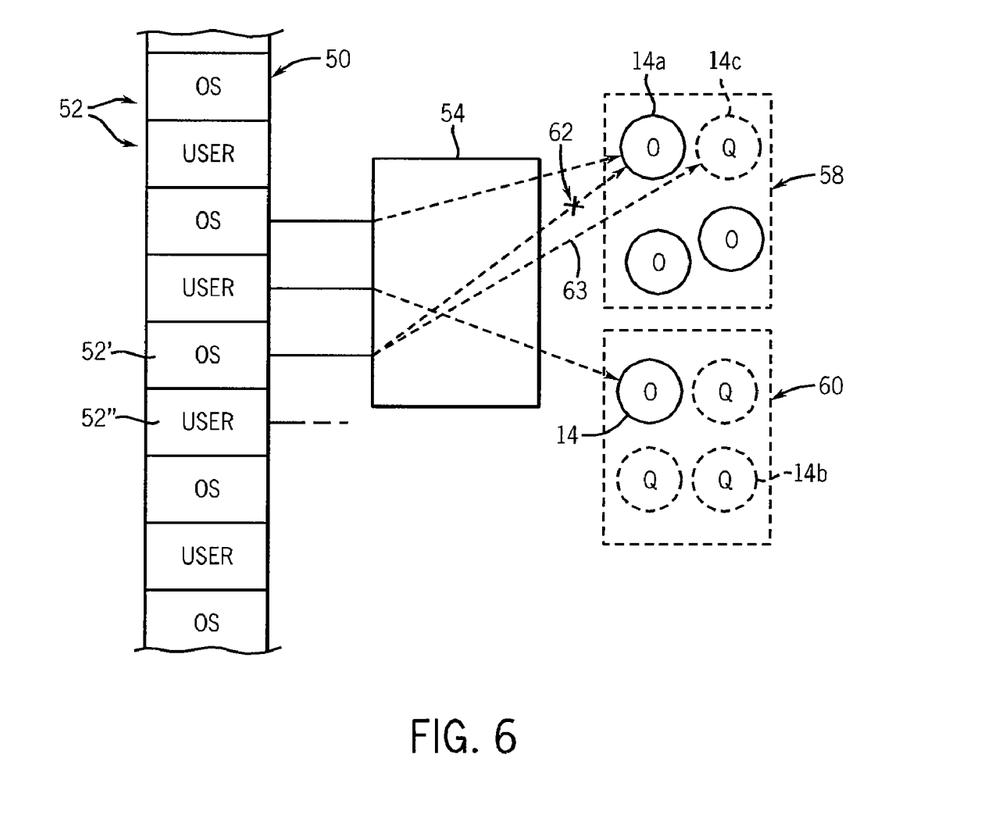
FIG. 6 is a diagram of the technique of computation spreading as may be implemented on the over-provisioned multicore processor of the present invention thereby reducing contention.

Referring to FIG. 6, this improvement in energy-delay product may be realized in a computation spreading system in which a given program thread 50 may have different fragments 52 allocated by the OPMS core controller 54 to different cores 14 depending on the type of computation. The different cores 14 may be optimized for specific types of computation within a given program, for example, by carefully identifying the similarity and dissimilarity of various computation fragments. This specialization is achieved via retaining values used for prediction during speculative execution, such as branch prediction.

In one computational spreading system described in K. Chakraborty, P. Wells, G. Sohi Computation Spreading: Employing Hardware Migration to Specialize CMP Cores on the Fly, ASPLOS '06, Oct. 21-20 5, 2006, San Jose, Calif., USA (2006 ACM 1-59593-451-0/06/0010), the fragments 52 are sorted according to whether they represent operating system instructions or instructions from a user program. These different types of instructions are routed by the OPMS core controller 54 to different cores 14 being either in a first group 58 (for operating system fragments 52) or a second group 60 (for user program fragments 52). Given cores 14 are allocated to only one group so as to maintain good speculative prediction parameters for those cores 14.

In this system, a given fragment 52', for example, being operating system instructions may be routed to group 58 but have a choice only of cores 14 that are already committed to executing other fragments 52 (indicated by the letter O). In this case, a contention 62 may occur with core 14a which in this example is already executing a different fragment 52. This contention 62 may force the system (e.g., a virtual CPU) to stall which can cause two problems. The first problem is that the stalling can prevent the scheduling and execution of other, later user instructions, for example, fragment 52" on the available resources of core 14b from group 60. The second problem is that the stalling can increase synchronization overhead caused by locks held by stalled fragments 52' or cross calls directed to those fragments 52', and this overhead may degrade the performance of the multicore processor 10. The inventors have detected 20% to 45% increase in run time for some workloads in computation spreading when extra cores 14 are not available.

In contrast the present invention, which provides extra cores 14, may activate a quiescent core 14c from group 58 (indicated by the letter Q) without violating the thermal envelope 32 because of other uncommitted cores 14b in group 60, for example. This extra core 14c prevents the stalling resulting from contention 62 by allowing the assignment indicated by arrow 63. The present inventors have determined that a 5 to 20% improvement in energy-delay product can be obtained in common workloads by providing over-provisioned cores 14. These figures were obtained with twelve cores 14, eight of which could operate at once within the thermal envelope 32. For each application, cores were provisioned such that the execution does not require stalling the primary computation mode (for example, OS computation in web-servers and user computation in others). It is likely that similar or better performance can be obtained with greater numbers of cores, for example, in 64-core machines likely in the next ten years.

Figure 5:
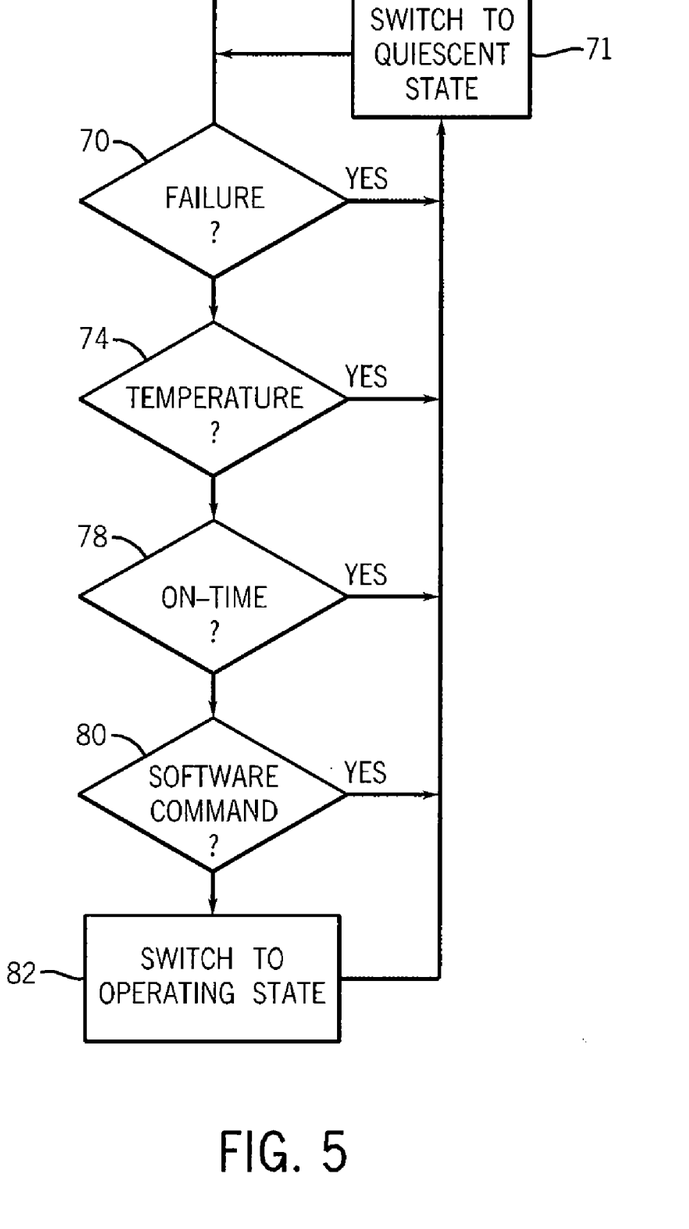
FIG. 5 is a flow chart of a program executed by the core controller of FIG. 1 for switching the cores of FIG. 1 between an operating state and a quiescent state having extremely low power dissipation.

Referring now to FIG. 5 the core controller 22 may operate a firmware program 68 which at a decision block 70 checks to see if any of the cores 14 have failed. The cores may indicate a failure by conventional failure detection techniques (e.g. register check bits, deadman timers and the like) providing a failure signal over control line 72 shown in FIG. 2. Such failures may be intermittent, for example, as a result of further decreases in the size of microprocessor transistors, the complexity of the circuits and decreasing circuit voltages.

Such intermittent failures may be also accommodated by the present system by switching in an over provisioned core 14. Thus, when a failure is detected, the program proceeds to process block 71 and the particular core that has failed is switched to a quiescent state. The decision block 70 considers all of the cores 14, switching off those that have failed.

Referring also to FIG. 2, the switching of a core to the quiescent state may make use of a number of techniques to reduce the power usage of the core (leakage current) during the quiescent state, including stopping the clock input 73 to the core 14 to stop switching losses, and controlling the power to the core by power control line 75 through the use of sleep transistors or reverse body bias for certain elements of the core 14. Generally the power to the registers 84 of the core 14 may be cut causing register values to be lost. Preferably, however, registers responsible for predictive functions in speculative execution 83 will be preserved (by maintaining some power to these registers) to aid in computation spreading as will be described below.

The remaining cores 14 are then evaluated at succeeding decision block 74 with respect to the temperature of the core 14. Referring also to FIG. 2, this temperature may be obtained from a temperature sensor 76 on the core 14 as shown in FIG. 2 providing a temperature control line 79 to the core controller 22.

Those cores 14 that have exceeded a temperature bound (short of damaging temperatures) are switched off per process block 71 and the remaining cores are evaluated at decision block 78 which considers the uninterrupted on time of the core 14. Decision block 78 may be used in lieu of decision block 74 for designs when temperature information is not available or may be used in addition to decision block 74 as a safety matter. Again those cores 14 that have exceeded the time limit (serving as a proxy for the temperature of the core 14) are switched off per process block 71 for a predetermined period of time.

The remaining cores 14 are considered at decision block 80 which reads the core state registers 24, the latter which may be set by software (for example, the computation spreading program described above) to allow software to switch the cores 14 into and out of the quiescent state (for example in response to the need to remove a contention). At decision block 80, cores 14 not needed to resolve a contention or that do not have fragments 52 assigned to them are also switched into a quiescent state per process block 71.

Those cores that have passed successfully through decision blocks 70 to 80 are switched to be in the operating state and available for use. Decision block 82 ensures that those active cores 14 do not exceed the known thermal envelope 32 of the substrate 12.

The present invention has been described in terms of the preferred embodiment, and it is recognized that equivalents, alternatives, and modifications, aside from those expressly stated, are possible and within the scope of the appending claims.

We claim:

1. An over-provisioned multicore electronic computer comprising:
   a set of N operable cores held on a substrate having a thermal dissipation limit that allows M cores to operate in an active state simultaneously and continuously;
   a core controller executing to:
   (1) during an execution period, repeatedly switch each of the N cores between the active state in which computation is performed and a quiescent state in which no computation is performed, and back again;
   (2) during the execution period, allow at most M cores to be simultaneously in the active state;
   (3) wherein M is at least one less than N.

2. The over-provisioned multicore electronic computer of claim 1 wherein the cores in the quiescent state have their clocks stopped.

3. The over-provisioned multicore electronic computer of claim 1 wherein the cores in the quiescent state have internal power reduction circuitry activated.

4. The over-provisioned multicore electronic computer of claim 1 wherein the core controller for switching the cores from active and quiescent state is implemented in at least one of firmware, software, and circuitry.

5. The over-provisioned multicore electronic computer of claim 1 wherein the quiescent state shuts down a central processing unit and its associated caches.

6. The over-provisioned multicore electronic computer of claim 1 wherein M is less than three quarters of N.

7. The over-provisioned multicore electronic computer of claim 1 wherein the core controller moves a program thread being executed from a core being switched to the quiescent state to a core in the active state.

8. The over-provisioned multicore electronic computer of claim 1 wherein the core controller switches the cores between active states and quiescent states as a function of time.

9. The over-provisioned multicore electronic computer of claim 1 wherein the core controller switches the cores between active states and quiescent states as a function of measured temperature of the cores.

10. The over-provisioned multicore electronic computer of claim 1 wherein the core controller switches the cores from the active state to the quiescent state when a core failure is detected and from the quiescent state to the active state when a core failure is no longer detected.

11. The over-provisioned multicore electronic computer of claim 1 wherein the core controller switches the cores between an active state and a quiescent state as triggered by software so that cores waiting for instructions are switched to a quiescent state.

12. The over-provisioned multicore electronic computer of claim 1 wherein there are no less than eight cores.

13. The over-provisioned multicore electronic computer of claim 1 wherein the computations are computations for an application program running on the multicore electronic computer.

14. The over-provisioned multicore electronic computer of claim 1 wherein the cores are identical.

15. An over-provisioned multicore electronic computer comprising:
   a set of N operable cores held on a substrate having a thermal dissipation limit that allows up to M cores to operate simultaneously;
   a core controller executing to:
   (1) during an execution period, repeatedly switch each of the N cores between an active state in which computation is performed and a quiescent state in which no computation is performed, and back again;
   (2) during the execution period, allow at most M cores to be simultaneously in the active state;
   (3) wherein M is at least one less than N
   wherein the cores in the quiescent state maintain values in storage elements relating to predictive functions used in speculative execution but do not maintain values in at least some storage elements not relating to predictive functions used in speculative execution.

16. An over-provisioned multicore electronic computer comprising:
an integrated circuit substrate having N cores each of which may switch between an operating state in which the cores process data and a quiescent state in which the cores: do not process data, no longer store in the core at least some operating state data, and have reduced power dissipation with respect to the operating state
wherein the substrate provides a thermal envelope preventing the simultaneous steady-state operation of more than N−1 cores and permitting the simultaneous steady-state operation of less than N−1 cores; and
a controller for the cores switching the cores between the operating state and the quiescent state so that:
(a) during a given period of time all cores repeatedly move between the operating state and the quiescent state according to the limitations imposed by the thermal envelope; and
(b) during the given period of time no more than N−1 cores are in the operating state.

17. The over-provisioned multicore electronic computer of claim 16 wherein the cores in the quiescent state have their clocks stopped.

18. The over-provisioned multicore electronic computer of claim 16 wherein the cores in the quiescent state have internal power reduction circuitry activated.

19. The over-provisioned multicore electronic computer of claim 16 wherein the cores in the quiescent state have their processing unit and its associated caches shut down.

20. The over-provisioned multicore electronic computer of claim 16 wherein more than one fourth of the cores are in the quiescent state.

21. The over-provisioned multicore electronic computer of claim 16 wherein there are no less than eight cores.

22. The over-provisioned multicore electronic computer of claim 16 wherein the core controller switches the cores from the active state to the quiescent state when a core failure is detected and from the quiescent state to the active state when a core failure is no longer detected.

23. An over-provisioned multicore electronic computer comprising:
an integrated circuit substrate having N cores each of which may switch between an operating state in which the cores process data and a quiescent state in which the cores: do not process data, no longer store in the core at least some operating state data, and have reduced power dissipation with respect to the operating state; and
a controller for the cores switching the cores between the operating state and the quiescent state so that:
(a) during a given period of time all cores repeatedly move between the operating state and the quiescent state; and
(b) during the given period of time no more than N−1 cores are in the operating state
wherein the cores in the quiescent state maintain values in storage elements relating to predictive functions used in speculative execution but do not maintain values in at least some storage elements not relating to predictive functions used in speculative execution.

* * * * *